June 30, 1959  C. W. TYDEMAN  2,892,645
HIGH PRESSURE FLUID SEALS
Filed Oct. 31, 1955  3 Sheets-Sheet 1

INVENTOR.
CLARENCE W. TYDEMAN
BY
ATTORNEYS

June 30, 1959 C. W. TYDEMAN 2,892,645
HIGH PRESSURE FLUID SEALS
Filed Oct. 31, 1955

INVENTOR.
CLARENCE W. TYDEMAN
BY
ATTORNEYS

June 30, 1959  C. W. TYDEMAN  2,892,645
HIGH PRESSURE FLUID SEALS
Filed Oct. 31, 1955  3 Sheets-Sheet 3

INVENTOR.
CLARENCE W. TYDEMAN
BY
ATTORNEYS

United States Patent Office

2,892,645
Patented June 30, 1959

2,892,645

HIGH PRESSURE FLUID SEALS

Clarence Walter Tydeman, Redwood City, Calif.

Application October 31, 1955, Serial No. 543,765

3 Claims. (Cl. 286—26)

This invention relates to improvements in high pressure fluid seals; and more particularly, to improvements in high pressure fluid seals for use in dynamic installations.

In my copending application Serial No. 534,284, filed September 14, 1955, now abandoned and entitled "High Pressure Fluid Seals," I disclosed a seal construction for relatively movable members in which an O-ring was placed in an annular groove within one of the relatively movable members in spaced relation to the sidewalls, and a band was placed between the O-ring and the other relatively movable member in position to seal the gap therebetween with the O-ring exerting a radial pressure upon the band. This seal required the O-ring to be squeezed between the band and the bottom of the groove while the fluid was permitted to enter the groove by passing through a gap left between the sides of the band and the sidewalls of the groove. The fluid pressure forced the O-ring against one side of the groove and caused it to expand radially to force the band into sealed contact with the other relatively movable part or member. In this instance, the radial distance between the bottom of the groove and the adjacent surface of the band was less than the cross-sectional diameter of the O-ring; whereas, the sidewalls of the groove were spaced apart a distance greater than the cross-sectional diameter of the O-ring.

I have now found, however, in accordance with the present invention that the above described high pressure fluid seal is relatively ineffective in many types of dynamic installations. In a number of present day constructions a piston must be moved through a variable but predetermined stroke within a cylinder and this stroke is governed by the quantity of fluid admitted to the high pressure side of the piston. Any leakage of the fluid past the piston will result in the piston moving less than the required distance and, hence, render the device ineffective for the purpose intended. In some installations the length of stroke of the piston is controlled to a few thousandths of an inch by the high pressure fluid seal described herein.

Tests on my earlier seal disclosed that some leakage of fluid past the seal took place when the fluid was first introduced to the high pressure side of the piston; however, the leak stopped as soon as the fluid pressure acting against the O-ring within the groove built up to the point where the band was forced into fluid-tight contact with the cylinder wall. Leakage of even this small quantity of fluid past the seal cannot, of course, be tolerated in installations requiring a carefully controlled stroke of the piston.

As mentioned in my earlier application the use of an O-ring alone is ineffective as the O-ring oftentimes is extruded into the gap between the relatively movable members and torn. Also, a few specific installations require a pulsating movement of the piston in which the stroke is less than the diameter of the O-ring. The O-rings fail quite rapidly in installations of this nature because the stroke is so short that the O-rings cannot pick up the lubricant. The high pressure fluid seal of the present invention, however, provides a construction which protects the O-ring and also enables materials to be used for the band which retain the lubricant because of their porosity such as, ductile iron and Amco-bronze; or, plastic materials which are known for their self-lubricating properties such as, Teflon and nylon.

It is, therefore, the principal object of the present invention to provide a more dependable and effective high pressure, dynamic fluid seal which takes full advantage of the many excellent characteristics of the O-ring; and yet, provides means for protecting the O-ring against those factors which are known to cause it to fail in service.

Another object of the invention is the provision of a high pressure fluid seal which will function to compensate for irregularities in the parts as a result of wear and poorly fitted mating surfaces.

Further objects of the invention are the provision of a high pressure fluid seal which is simple and inexpensive, readily adaptable for use with many of the common dynamic seal O-ring applications, and a seal which is also suitable for use in static O-ring applications where excessive fluid pressures may cause failure of the O-ring alone.

Other objects of the invention will be in part apparent and in part pointed out specifically hereinafter in connection with the description of the drawing which follows; and in which.

Figure 1:
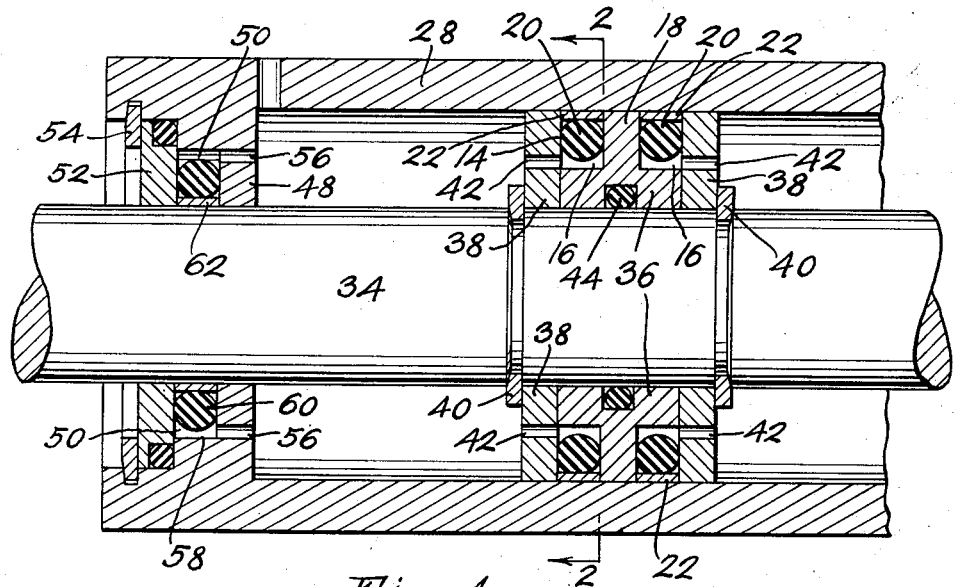
Figure 1 is a fragmentary longitudinal section of a three-part piston and a cylinder in which the piston is provided with the high pressure fluid seal of the present invention utilizing endless bands.
Figure 2:
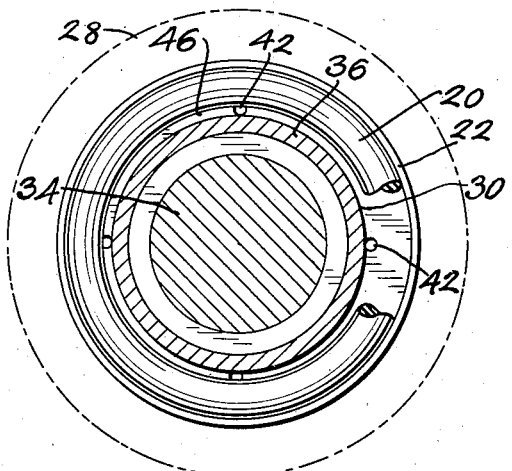
Figure 2 is a transverse section taken along line 2—2 of Figure 1, portions of which have been broken away to better show the construction.

In connection with Figures 1 and 2 of the drawing, it will be seen that cylinder 28 is provided with a piston 18 mounted on shaft 34 for axial movement in the cylinder. The piston contains two axially spaced annular grooves 16 having spaced parallel sidewalls 14, as shown. The grooves in the particular piston shown are formed between body 36 and endplates 38 which are mounted on opposite ends of the body and retained in place on the shaft by lock-rings 40. Each of the endplates is provided with one or more ports 42 communicating the interior of the cylinder with the bottom of the nearest groove. A conventional O-ring seal 44 has been shown between the body of the piston and the shaft. O-rings 20 having a cross-sectional diameter greater than the width of the grooves 16 are fitted therein and make continuous line contact with the sidewalls of the groove but lie spaced from the bottom 30 of the groove. Endless bands 22 are placed in the grooves surrounding the O-rings and making continuous line contact therewith.

The head 48 of the cylinder is provided with an annular groove 50 formed between the head and disk 52 held in place on the cylinder by lock ring 54. The cylinder head is provided with one or more ports 56 communicating the interior of the cylinder with the space between the bottom 58 of the groove and O-ring 60. Endless band 62 is placed between the shaft and the O-ring within groove 50. The specific three element piston illustrated in the drawing is intended as being merely illustrative of one type of piston that could be used with the endless bands 22. It is apparent from the drawing that only one of the piston seals will be fully operative at a time and it, of course, is the one adjacent the high pressure side of the cylinder. The shaft seal, on the other hand, will be operative at any time there is fluid under pressure within that end of the cylinder.

Figure 3:
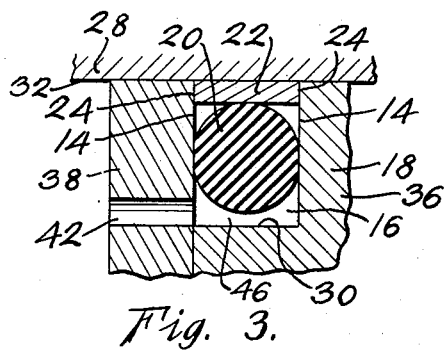
Figure 3 is an enlarged fragmentary section showing the high pressure fluid seal of the present invention before the pressure is applied thereto.

Figure 3 is an enlarged view showing the details of construction of the high pressure fluid seal of the present invention before the seal has been placed under pressure. It will be noted that the endless band 22 is fitted between the sidewalls of the groove with a medium fit which will permit radial sliding movement of the edges 24 of the band along the sidewalls. This is to be distinguished from applicant's co-pending application, aforementioned, in which the band is fitted with a loose fit to permit the fluid to enter the groove between the edges of the band and the sidewalls. The cross-sectional diameter of the O-ring is such that it will be squeezed slightly between the sidewalls of the groove. The endless band 22 encircles the O-ring and makes continuous line contact therewith. It is important to note that the O-ring makes continuous line contact with the sidewalls of the groove and the band while the bottom 30 of the groove is spaced from the O-ring to permit the entrance of fluid beneath the O-ring as it is forced through port 42 in the endplates of the piston.

Figure 4:
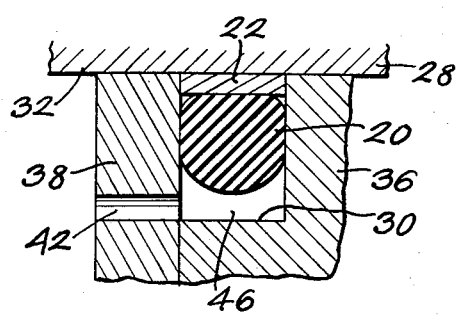
Figure 4 is a view similar to Figure 3 showing the seal under the influence of high fluid pressure.

In Figure 4 the position of the seal under pressure is shown. The pressure exerted by the fluid on the high pressure side of the cylinder is forced through port 42 into the annular cavity 46 beneath the O-ring which expands the O-ring radially against the band. The band, in turn, is expanded radially into fluid-tight sealed contact with the relatively movable cylinder wall 32. Obviously, in the case of the shaft seal the O-ring 50 is contracted radially rather than expanded, which causes the band 62 to contract into fluid-tight sealed contact with the shaft.

It is also to be noted in connection with the instant seal construction that the O-ring is retained against lateral movement by the sidewalls of the groove and, hence, cannot move to one side of the band and cause it to tilt within the groove. Also, the fluid enters the bottom of the groove and does not act directly on the band in a manner which would cause it to leak as explained above.

Figure 5:
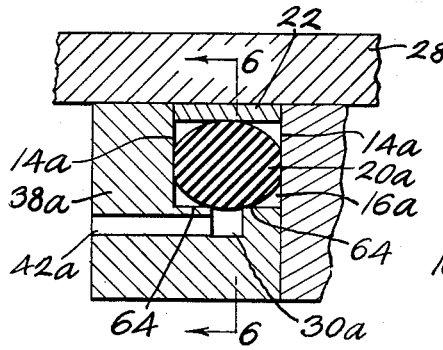
Figure 5 is an enlarged fragmentary section showing a slightly modified piston construction and an O-ring having an oval cross section.
Figure 6:
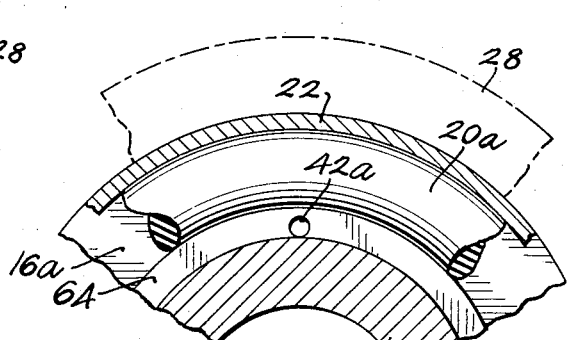
Figure 6 is a section taken along line 6—6 of Figure 5.

In connection with Figures 5 and 6 of the drawing wherein a slightly modified form of annular groove and O-ring are illustrated, it will be seen that the endplate 38a is provided with a modified groove 16a in which annular ledges 64 are formed in the bottom 30a of the groove adjacent the sidewalls 14a thereof to act as a support for the O-ring 20a to hold it in spaced relation to the bottom of the groove. Port 42a communicates the high pressure side of the cylinder with the bottom of the groove beneath the O-ring as aforementioned. The O-ring 20a has been shown with an oval cross section rather than circular although it occupies the same relation to the groove and band as the circular cross section O-ring of Figures 3 and 4. It is apparent that the particular cross section of the O-ring is important only insofar as said cross section permits line contact to be made with the sidewalls of the groove and the band.

Figure 7:
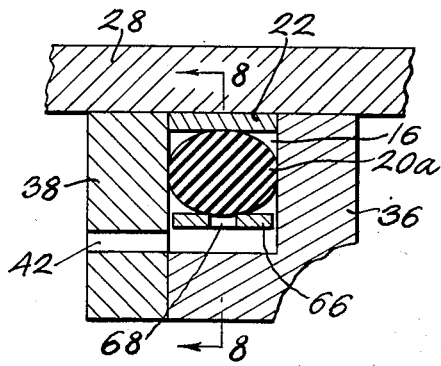
Figure 7 is an enlarged fragmentary section similar to Figure 3 showing the use of the spring band inside the O-ring to force it radially outward against the band.
Figure 8:
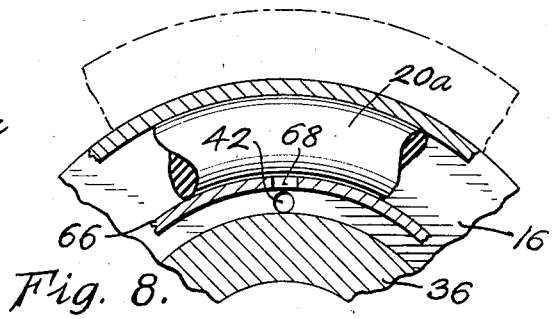
Figure 8 is a section taken along line 8—8 of Figure 7.

Figures 7 and 8 illustrate a further modification in which O-ring 20a is radially expanded against endless band 22 by spring band 66. The spring band is provided with a plurality of openings 68 to permit the fluid entering port 42 to act upon the O-ring and accomplish the necessary radial expansion. Obviously, spring band 66 could also be used to contract the O-ring in the case of the shaft seal.

Figure 9:
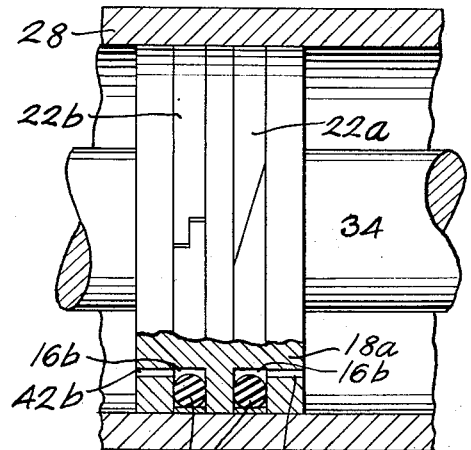
Figure 9 is a fragmentary longitudinal section of a one-piece piston and a cylinder with a slightly modified form of high pressure fluid seal in which split bands rather than endless bands are used.

Figure 9 of the drawing shows a one-piece piston 18a provided with axially spaced annular grooves 16b. Ports 42b communicate the grooves with the adjacent side of the cylinder, as shown. With the solid piston construction split bands 22a and 22b are used. Band 22a is shown provided with a diagonal joint; whereas, band 22b is provided with a step joint. The split rings permit somewhat greater radial expansion than is normally obtainable in those constructions employing the endless bands.

Figure 10:
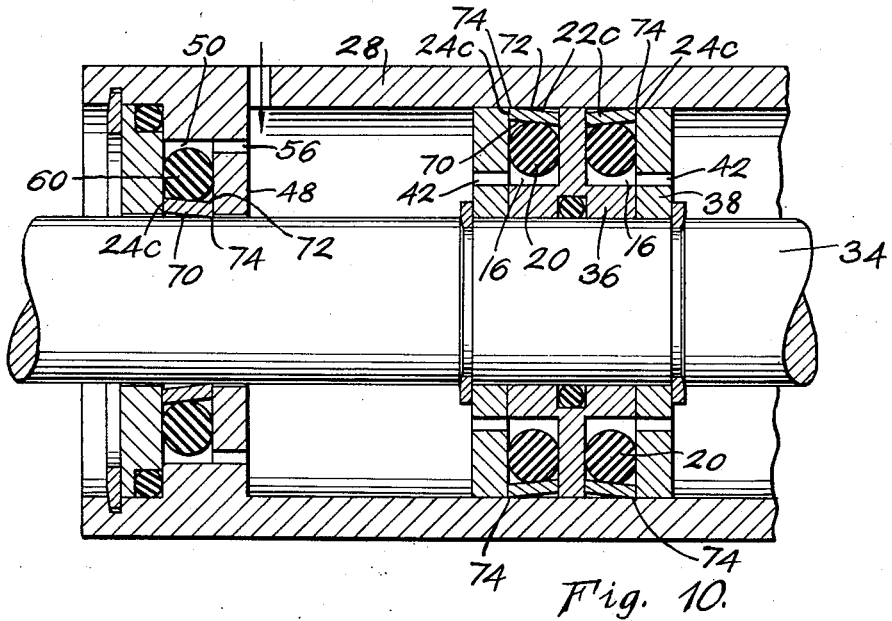
Figure 10 is a view similar to Figure 1 showing a slightly modified band construction; and, Figure 11 is an enlarged view in section showing the construction of the modified band of Figure 10.
Figure 11:
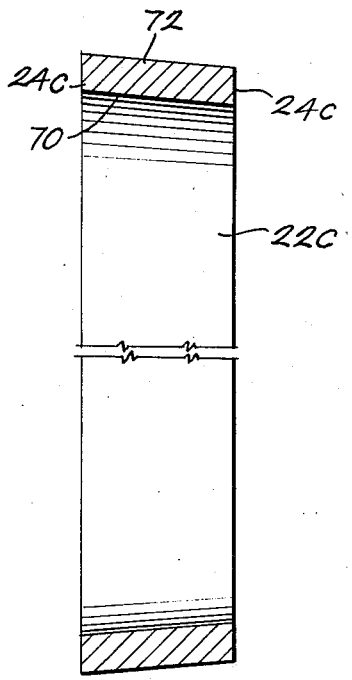

Figures 10 and 11 illustrate the preferred embodiment of the high pressure fluid seal of the present invention in which the bands 22c are formed to provide frusto-conical, parallel inner and outer surfaces 70 and 72 respectively. The cross section of the bands 22c is a parallelogram, but not a rectangle, as the inner and outer surfaces of the ring are parallel and frusto-conical rather than cylindrical as was the case with the bands of the Figures 1 through 9, inclusive, construction. The perpendicular distance between the parallel edges 24c of the bands is substantially equal to the width of the grooves. Thus, the outer surface 72 of the band in the piston seal and inner surface 70 of the band in the shaft seal contact the relatively movable element (cylinder wall and shaft) only along edge 74 which is adjacent the high pressure acting thereon. As the radial pressure increases due to the pressure exerted by the O-ring, the bands 22c tend to become wedged in the grooves and the edge 74 is forced more tightly against the relatively movable part adjacent thereto. The frusto-conical surfaces of the piston bands taper in the direction of the center of the piston; whereas the frusto-conical surfaces of the shaft band taper in the direction of the interior of the cylinder. The preferred band construction of Figures 10 and 11 has been found to be highly successful even in those instances in which an absolute fluid tight seal under high fluid pressures is necessary. The remaining elements of the piston and cylinder in Figure 10 are substantially the same as those of Figure 1.

The bands with the high pressure fluid seals of the present invention are preferably formed of ductile iron or Amco-bronze because of their porosity which enables them to retain lubricants and because of their elasticity. In instances which require a greater degree of elasticity in an endless band than is obtainable from the foregoing materials, Teflon and nylon are preferred. Obviously, the bands of Figures 10 and 11 may be interchanged with the cylindrical bands of the Figures 1 through 9, inclusive, constructions. Also, the frusto-conical bands can be used with the groove constructions of Figures 5 and 6 as well as with the spring band of Figures 7 and 8.

From the foregoing description of the high pressure fluid seal of the present invention and its several modifications it will be seen that the seal presents a considerable improvement over that shown and described in my copending application and that the many objects for which it was designed have been achieved; and therefore,

I claim:

1. A high pressure fluid seal for use between two members mounted one within the other for relative movement, one of which contains an annular groove for the reception of said seal formed by separable, spaced substantially parallel side walls and a bottom wall, said grooved member also containing a passage connecting the bottom of the groove with a source of fluid under pressure, comprising: an endless flexible ring positioned in the groove in spaced relation to the bottom wall and in continuous annular contact with the side walls thereof; and, an elastic band positioned in the groove in continuous annular contact with the ring between said ring and the other relatively movable member, the outer and inner surfaces of said band being parallel and conical, the edges of the band lying in spaced parallel planes, the conical surfaces of the band flaring in the direction of the high-pressure end of the grooved member, the fluid under pressure entering the bottom of the groove through the passage into the space beneath the ring acting to move said ring radially against the band and force the edge of the band into fluid-tight line contact with the other of the relatively movable members.

2. A high pressure fluid seal for use between two members mounted one within the other for relative movement, one of which contains an annular groove for the reception of said seal formed by separable, space substantially parallel side walls and a bottom wall, said grooved member also containing a passage connecting the bottom of the groove with a source of fluid under pressure, said seal comprising: an endless flexible ring positioned in the groove in spaced relation to the bottom wall to form a continuous annular passage between said ring and groove bottom connected to the source of fluid through the passage in the grooved member, said ring being compressed between the side walls of the groove to form a continuous, annular, fluid-tight seal therewith; and, an endless elastic band having edges lying in spaced parallel planes and a conical outer surface extending between the edges positioned in the groove in continuous annular contact with the ring between said ring and other relatively movable member, the conical outer surface of the ring flaring in the direction of the high-pressure end of the grooved member whereby the fluid entering the bottom of the groove will act to move the ring radially against the band and, in turn, cause the band to move radially into sealed, fluid-tight, line contact with the other of said relatively movable members.

3. A device in accordance with claim 2 in which the width of the band is substantially equal to the spacing between the side walls of the groove whereby said band will tend to become wedged in the groove as radial pressure is applied thereto by the ring.

References Cited in the file of this patent

UNITED STATES PATENTS

| | | |
|---|---|---|
| Re. 24,440 | Groen | Mar. 4, 1958 |
| 866,443 | Dyer | Sept. 17, 1907 |
| 896,947 | Stallman | Aug. 25, 1908 |
| 1,618,511 | Burstall | Feb. 22, 1927 |
| 1,902,222 | Eksergian | Mar. 21, 1933 |
| 2,509,672 | Christensen | May 30, 1950 |
| 2,520,306 | Detweiler | Aug. 29, 1950 |
| 2,607,644 | Smith et al. | Aug. 19, 1952 |
| 2,615,769 | Barnes et al. | Oct. 28, 1952 |
| 2,625,413 | Christensen | Jan. 13, 1953 |

FOREIGN PATENTS

| | | |
|---|---|---|
| 1,049,256 | France | Aug. 19, 1953 |
| 1,101,256 | France | Apr. 20, 1955 |